United States Patent
Di Ronza et al.

(10) Patent No.: US 11,046,837 B2
(45) Date of Patent: Jun. 29, 2021

(54) RUBBER COMPOUNDS FOR PNEUMATIC TYRE PARTS COMPRISING LIGNIN AS AN ANTIOXIDANT AGENT

(71) Applicant: BRIDGESTONE CORPORATION, Tokyo (JP)

(72) Inventors: Raffaele Di Ronza, Rome (IT); Claudia Aurisicchio, Rome (IT); Ludovica Caliano, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 232 days.

(21) Appl. No.: 16/463,087

(22) PCT Filed: Nov. 24, 2017

(86) PCT No.: PCT/EP2017/080365
§ 371 (c)(1),
(2) Date: May 22, 2019

(87) PCT Pub. No.: WO2018/099820
PCT Pub. Date: Jun. 7, 2018

(65) Prior Publication Data
US 2019/0345315 A1    Nov. 14, 2019

(30) Foreign Application Priority Data
Nov. 29, 2016    (IT) .................. 102016000120840

(51) Int. Cl.
| | |
|---|---|
| *C08L 7/00* | (2006.01) |
| *C08L 9/00* | (2006.01) |
| *C08K 3/04* | (2006.01) |
| *C08K 3/06* | (2006.01) |
| *C08K 5/09* | (2006.01) |
| *C08K 3/22* | (2006.01) |
| *C08K 5/47* | (2006.01) |
| *C08L 97/00* | (2006.01) |
| *B60C 1/00* | (2006.01) |

(52) U.S. Cl.
CPC .................. *C08L 7/00* (2013.01); *C08K 3/04* (2013.01); *C08K 3/06* (2013.01); *C08K 3/22* (2013.01); *C08K 5/09* (2013.01); *C08K 5/47* (2013.01); *C08L 9/00* (2013.01); *C08L 97/005* (2013.01); *B60C 1/00* (2013.01); *C08L 2201/08* (2013.01)

(58) Field of Classification Search
CPC .. C08L 7/00; C08L 9/00; C08L 97/005; C08L 2201/08; C08K 5/47; C08K 3/06; C08K 3/04; C08K 3/22; C08K 5/09; B60C 1/00
See application file for complete search history.

(56) References Cited

U.S. PATENT DOCUMENTS

2016/0122515 A1    5/2016  Karampelas

FOREIGN PATENT DOCUMENTS

EP    0 461 463 A2    12/1991

OTHER PUBLICATIONS

International Search Report for PCT/EP2017/080365 dated Mar. 27, 2018 [PCT/ISA/210].

*Primary Examiner* — Angela C Scott
(74) *Attorney, Agent, or Firm* — Sughrue Mion, PLLC

(57) ABSTRACT

Rubber compound for preparing pneumatic tyre parts comprising a cross-linkable unsaturated chain polymer base, a filler, a vulcanization system and one or more antioxidant agents. The antioxidant agents comprise functionalized lignin with —OR groups, where R is a terpene group with a total number of carbon atoms of between 6 and 16. The —OR groups deriving from the functionalization of 10 to 60% of the lignin phenolic hydroxyl groups.

9 Claims, No Drawings

RUBBER COMPOUNDS FOR PNEUMATIC TYRE PARTS COMPRISING LIGNIN AS AN ANTIOXIDANT AGENT

CROSS REFERENCE TO RELATED APPLICATIONS

This application is a National Stage of International Application No. PCT/EP2017/080365 filed Nov. 24, 2017, claiming priority based on Italian Patent Application No. 102016000120840 filed Nov. 29, 2016.

The present invention relates to the use of functionalized lignin as an antioxidant agent for rubber compounds for pneumatic tyre parts.

As is known, rubber compounds that are made in order to prepare the various parts of a pneumatic tyre provide the use of antioxidant agents in order to avoid degradation of the rubber due to the reaction of the polymer base with oxygen and/or ozone.

Antioxidant agents are materials that are added to compounds that are susceptible to oxidation, such as polymers, in order to inhibit or slow down the oxidation processes (themselves becoming oxidized). In other words, antioxidant agents are materials capable of reacting with atmospheric agents, avoiding, therefore, that they react with the polymer base.

The compound concentration of the antioxidant agents depends upon the level of exposure to the atmosphere and the conditions of temperature and mechanical stress affecting the specific part of the pneumatic tyre to which the compound refers.

The antioxidant agents most commonly used belong to the paraphenylenediamines (PPD) family, such as for example N-1,3-dimethylbutyl-N'-phenyl-paraphenylenediamine (6PPD), N,N'-diphenyl-p-phenylenediamine (DPPD), or else phenol derivatives such as 2,6-Di-tert-butyl-4-methylphenol (BHT), or to the quinoline family, such as for example Poly(1,2-dihydro-2,2,4-trimethylquinoline) (TMQ).

The use has long been known of lignin as an antioxidant agent in rubber compounds.

Lignin is an organic substance that binds the cells and fibers that constitute wood and the lignified elements of plants. After cellulose, it is the most abundant renewable source of carbon on earth. Although it is not possible to define the precise structure of lignin as a chemical molecule, it is however possible to identify lignin as a polymeric structure based on the following three phenylpropane units: -p-coumaryl alcohol; -coniferyl alcohol (4-hydroxy-3-methoxycinnamyl alcohol); -sinapyl alcohol (4-hydroxy-3,5-dimethoxycinnamyl alcohol). As can easily be inferred from the chemical structure of the basic components of lignin, the latter is particularly rich in hydroxyl groups—mainly of the phenolic, alcohol or carboxylic type—that render the lignin itself particularly suitable for functionalization by means of esterification and/or etherification reactions.

There are several lignin extraction processes, including the Kraft process and the process of Sulfonation.

Kraft Lignin is a byproduct of the Kraft process that is used to chemically extract cellulose from wood. It is obtained by means of precipitation, lowering the pH of the quenched liquor from the Kraft process. The phenolic, alcohol, and carboxylic hydroxyls are the main identifiable functional groups in Kraft lignin, while thiol groups are present to a lesser extent.

By contrast, the Sulfonation process contributes to obtaining a lignin characterized by the presence of high concentrations of sulfonic groups.

As it may be immediately understood by a person skilled in the art, the use of lignin to replace known antioxidant agents derived from petroleum, represents a significant advantage in terms of sustainability. In fact, lignin is a natural product obtained from paper industry waste products. In this respect, it should also be specified that the disposal of lignin is a limiting step within the paper production chain.

The inventors of the present invention have developed a solution in order to improve and make better use of the antioxidant capacities of lignin.

The object of the present invention is a rubber compound for the preparation of pneumatic tyre parts comprising at least one cross-linkable unsaturated-chain polymer base, a filler, a vulcanization system and one or more antioxidant agents;

said compound being characterized in that said antioxidant agents comprise functionalized lignin with —OR groups, where R is a terpene group with a number of carbon atoms of between 6 and 16; said —OR groups resulting from 10 to 60%, preferably 20 to 50%, functionalization of the lignin phenolic hydroxyl groups.

As can be seen from the above, the —OR groups are made by an etherification reaction between the lignin phenolic hydroxyl group and a halide of the corresponding terpene derivative.

Here and hereinafter, by vulcanization system is meant a complex of ingredients comprising at least sulfur and accelerator compounds, that in the preparation of the compound are added in a final mixing step, and have the purpose of promoting the vulcanization of the polymer base once the compound is subjected to a vulcanization temperature.

Here and hereinafter, the term "cross-linkable unsaturated-chain polymer base" refers to any natural or synthetic non-cross-linked polymer capable of assuming all of the chemical-physical and mechanical characteristics typically assumed by elastomers after cross-linking (vulcanization) with sulfur-based systems.

It has been proven that whenever the lignin phenolic hydroxyl groups, that are linked with terpene groups, constitute more than 50% of the total hydroxyl groups the antioxidant properties of the lignin decrease to such an extent that the invention no longer has the sought-after benefits. The decrease in the antioxidant properties is due to the fact that the number of hydroxyl groups available to react with oxygen has been reduced, preventing the same from causing the oxidation of the polymer base.

Preferably, said terpene groups are geranyl groups (—$CH_2CHC(CH_3)CH_2CH_2CHC(CH_3)_2$).

Preferably, said compound comprises 1 to 10 phr of said functionalized lignin.

Preferably, said functionalized lignin is derived from Kraft lignin.

A further object of the present invention is a pneumatic tyre portion made using the compound according to the present invention.

A still further object of the present invention is a pneumatic tyre comprising a portion made with a compound according to the present invention.

A still further object of the present invention is the use of functionalized lignin as an antioxidant agent in rubber compounds for the production of pneumatic tyre parts; said functionalized lignin comprising —OR groups, where R is a terpene group with a number of carbon atoms of between 6 and 16; said —OR groups resulting from 10 to 60% functionalization, preferably 20 to 50%, of the lignin phenolic hydroxyl groups.

For a better understanding of the invention, the following are given as purely illustrative and non-limiting embodiments thereof.

EXAMPLES 4 compounds were prepared of which: the first (Compound A) represents a first comparison example, wherein the antioxidant agent used in the compound is commonly used and of the type derived from petroleum (BHT); the second (Compound B) represents a second comparison example, wherein the use of an antioxidant agent is not provided; the third (Compound C) represents a third comparison example, wherein the antioxidant agent used is non-functionalized lignin; and the fourth (Compound D) represents an example of the invention, wherein the antioxidant agent used is functionalized lignin with terpene groups.

The example compounds were prepared according to the procedure reported below.

Here and below by "non-productive blending step" is meant a blending step wherein, to the cross-linkable unsaturated chain polymeric base are added and mixed the ingredients of the compound except for the vulcanization system; whilst by "productive blending step" is meant a blending step wherein, to the compound being prepared the vulcanization system is added and mixed.

—Preparation of the Compounds—
(1$^{st}$ Non-Productive Blending Step)

Before the start of the mixing, a closed chamber mixer with an internal volume of between 230 and 270 liters was loaded with the polymer base and the antioxidant agent reaching a fill factor of between 66-72%.

The mixer was operated at a speed of between 40-60 rpm, and the mixture thus formed was discharged once a temperature of 145-165° C. had been reached.

(2$^{nd}$ Non-Productive Blending Step)

Carbon black and stearic acid were added to the compound obtained from the previous step. The mixture thus prepared was reworked in the mixer operating at a speed of between 40-60 rpm and subsequently removed once a temperature of between 130-150° C. had been reached.

(Productive Blending Step)

Added to the mixture obtained from the previous step was the vulcanization system composed of sulfur, accelerants and zinc oxide reaching a fill factor of between 63-67%.

The mixer was operated at a speed of between 20-40 rpm, and the mixture thus formed was discharged once a temperature of between 80-110° C. had been reached.

Table I reports the compositions in phr of the Compounds A-D.

TABLE I

|  | A | B | C | D |
|---|---|---|---|---|
| NR |  | 50.0 |  |  |
| BR |  | 50.0 |  |  |
| BHT | 4 | — | — | — |
| Non-functionalized lignin | — | — | 4 | — |
| Functionalized lignin | — | — | — | 4 |
| Carbon black |  | 50.0 |  |  |
| Stearic acid |  | 2.0 |  |  |
| Zn oxide |  | 3.0 |  |  |

TABLE I-continued

|  | A | B | C | D |
|---|---|---|---|---|
| Sulfur |  | 1.0 |  |  |
| CBS |  | 1.0 |  |  |

NR is a 1,4-cis polyisoprene rubber of natural origin.

BR is a butadiene rubber with a 1,4-cis content of at least 40%.

Carbon black is classified according to the ASTM nomenclature as N550.

BHT is the acronym for 2,6-Di-tert-butyl-4-methylphenol and is one of the commonly used antioxidant agents deriving from petroleum.

CBS is the cyclohexyl-benzothiazyl-sulfenamide vulcanization accelerant.

The non-functionalized lignin used is marketed by Sigma Aldrich under the trade name of Alkali Lignin.

The following is an illustrative and non-limiting exemplary embodiment of functionalized lignin according to the invention.

The lignin sample was solubilized in a basic aqueous solution. The solution was heated to 50° C. and reacted for about 4 hours with a concentration of Geranyl Bromide necessary in order to obtain the required functionalization level.

After cooling the solution was precipitated by means of acidification and the solid residue was washed and centrifuged before being recovered.

The compounds reported in Table I were tested in order to evaluate their mechanical properties.

The mechanical properties were measured in accordance with the ASTM D412C standard.

In particular the properties relating to the M300 modulus were measured, TB (tension at break); M300% modulus; EB (elongation at break).

The mechanical properties were measured using samples both before and after they were subjected to an aging process. The aging process involves keeping the same samples in an oven at 100° C. according to the standard ISO 188.

Table II reports the results relating to the mechanical properties for the examples described above.

For more immediate evidence of the benefits relating to the compound of the present invention, the values obtained from the tests are reported in Table II in indexed form against the results obtained from the respective compounds before they were subjected to the aging process.

TABLE II

|  | A | B | C | D |
|---|---|---|---|---|
| Before the aging process | | | | |
| M300 | 100 | 100 | 100 | 100 |
| TB | 100 | 100 | 100 | 100 |
| EB | 100 | 100 | 100 | 100 |
| After the aging process | | | | |
| M300 | 150 | 180 | 143 | 130 |
| TB | 88 | 80 | 89 | 90 |
| EB | 70 | 50 | 77 | 80 |

As can be seen from the values reported in Table II, the use of the functionalized lignin compound according to the present invention (Compound D) is able to guarantee better maintenance of the mechanical properties of the compound over time compared to both the antioxidant agents of the prior art (Compound A) and the non-functionalized lignin (Compound C). In fact, the compounds of the invention, once aged, despite having M300 values that are higher than those of the non-aged compound, nevertheless exhibit a percentage increase that is lower than that observed in the case of the control compound A.

The invention claimed is:

1. Rubber compound for preparing pneumatic tyre parts comprising at least one cross-linkable unsaturated chain polymer base, a filler, a vulcanization system and one or more antioxidant agents;
   said compound being characterized in that said antioxidant agents comprise functionalized lignin with —OR groups, wherein R is a terpene group with a total number of carbon atoms of between 6 and 16; said —OR groups resulting from the 10 to 60% functionalization of the lignin phenolic hydroxyl groups based on the total amount of hydroxyl groups present within the lignin.

2. Rubber compound according to claim 1, characterized in that said —OR groups derive from the functionalization of 20 to 50% of the lignin phenolic hydroxyl groups.

3. Rubber compound according to claim 1 characterized in that said terpene groups are $(CH_2CHC(CH_3)CH_2CH_2CHC(CH_3)_2)$.

4. Rubber compound according to claim 1, characterized in that said compound comprises from 1 to 10 phr of said functionalized lignin.

5. Rubber compound according to claim 1, characterized in that said functionalized lignin is derived from kraft lignin.

6. Portion of a pneumatic tyre comprising the rubber compound of claim 1.

7. Pneumatic tyre, characterized in that it comprises a portion according to claim 6.

8. A method for preparing a rubber compound for producing pneumatic tyre parts; comprising mixing at least one cross-linkable unsaturated chain polymer base, a filler, a vulcanization system and one or more antioxidant agents; said method being characterized in that said antioxidant agents comprise functionalized lignin comprising —OR groups, where R is a terpene group with a number of carbon atoms of between 6 and 16; said —OR groups deriving from the 10 to 60% functionalization of the lignin phenolic hydroxyl groups based on the total amount of hydroxyl groups present within the lignin.

9. The method according to claim 8, characterized in that said —OR groups derive from the functionalization of from 20 to 50% of the lignin phenolic hydroxyl groups.

* * * * *